United States Patent
Wey

Patent Number: 5,788,400
Date of Patent: Aug. 4, 1998

[54] QUICK CONNECTING BAYONET STYLE LINKAGE

[75] Inventor: Edward J. Wey, Waxhaw, N.C.

[73] Assignee: The Torrington Company, Torrington, Conn.

[21] Appl. No.: 863,697

[22] Filed: May 27, 1997

[51] Int. Cl.⁶ .................................................. F16B 21/08
[52] U.S. Cl. .......................... 403/329; 403/319; 403/354; 24/589
[58] Field of Search ........................... 403/315, 319, 403/329, 354, 349, 302, 310–313, 309, 344, 316, 317, 326; 24/589, 614, 662, 671

[56] References Cited

U.S. PATENT DOCUMENTS

| 1,071,404 | 8/1913 | Duquette | 24/671 X |
|---|---|---|---|
| 2,259,797 | 10/1941 | Cohen | 64/4 |
| 3,280,439 | 10/1966 | McCarthy | 403/354 X |
| 3,881,334 | 5/1975 | Wilson | 24/589 X |
| 4,368,562 | 1/1983 | Minami | 403/354 |
| 4,422,212 | 12/1983 | Sheiman et al. | 16/29 |
| 4,466,377 | 8/1984 | Kolb et al. | 16/114 R |
| 4,470,716 | 9/1984 | Welch | 403/254 |
| 4,850,735 | 7/1989 | Hansen et al. | 403/329 X |

FOREIGN PATENT DOCUMENTS 109031 11/1943 Sweden.

*Primary Examiner*—Harry C. Kim
*Attorney, Agent, or Firm*—Robert F. Palermo

[57] ABSTRACT

A quick connecting bayonet style linkage has a hollow tube member with a transversely disposed pin near an engaging end; a shaft member sized to have a sliding fit in the engaging end of the hollow tube member and having a transversely disposed slot sized top slide over the transversely disposed pin; and provision for capturing the shaft member within the engaging end of the hollow tube member when the transversely disposed pin is engaged with the transversely disposed slot.

5 Claims, 2 Drawing Sheets

QUICK CONNECTING BAYONET STYLE LINKAGE

BACKGROUND OF THE INVENTION

This invention relates generally to connection systems for rods, tubes, and shafts and more particularly to a simplified bayonet style connection device for use in such systems.

Shafts and tubes are commonly connected by drilling holes through both members and installing a threaded fastener, a roll pin, or a fitted pin with a retaining ring or key. During assembly of such structural members, difficulty is often encountered in aligning the holes of the shaft and tube, fitting the pin or fastener into the holes, and clamping or torquing the fastener to secure the connection. Handling the shaft, tube, bolt, nut, and washers demands dexterity, and often, even a skilled assembler drops parts, loses them, or otherwise experiences difficulty. The result is reduced productivity, inconsistent assembly quality, and reduced service life for the product.

The foregoing illustrates limitations known to exist in present shaft and tube connection systems, and it would be advantageous to provide an alternative directed to overcoming one or more of those limitations. Accordingly, a suitable alternative is provided including features more fully disclosed hereinafter.

SUMMARY OF THE INVENTION

In one aspect of the present invention, a quick connecting bayonet style linkage is provided, including a hollow tube member having a transversely disposed pin near an engaging end; a shaft member sized to have a sliding fit in the engaging end of the hollow tube member and having a transversely disposed slot sized to slide over the transversely disposed pin; and a mechanism for capturing the shaft member within the engaging end of the hollow tube member when the transversely disposed pin is engaged with the transversely disposed slot.

The foregoing and other aspects of the invention will become apparent from the following detailed description, when considered in conjunction with the accompanying drawings.

DETAILED DESCRIPTION

Figure 1:
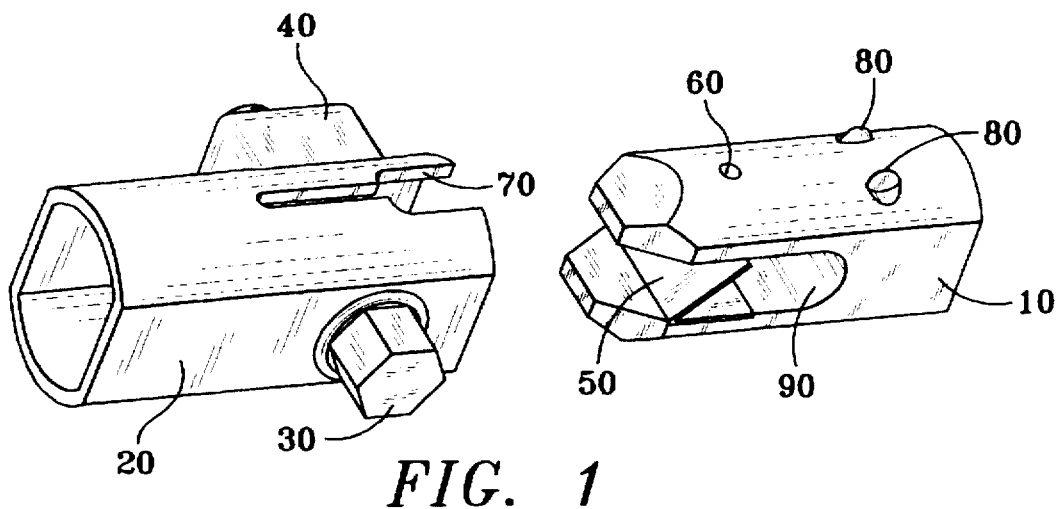
FIG. 1 is a schematic perspective view illustrating a bayonet style connecting system according to the invention.
Figure 2:
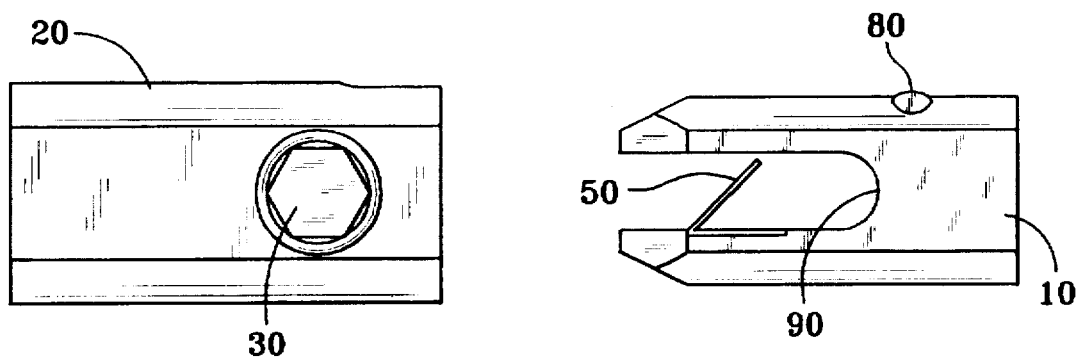
FIG. 2 is a schematic elevation view of the shaft member and the tube member.
Figure 3:
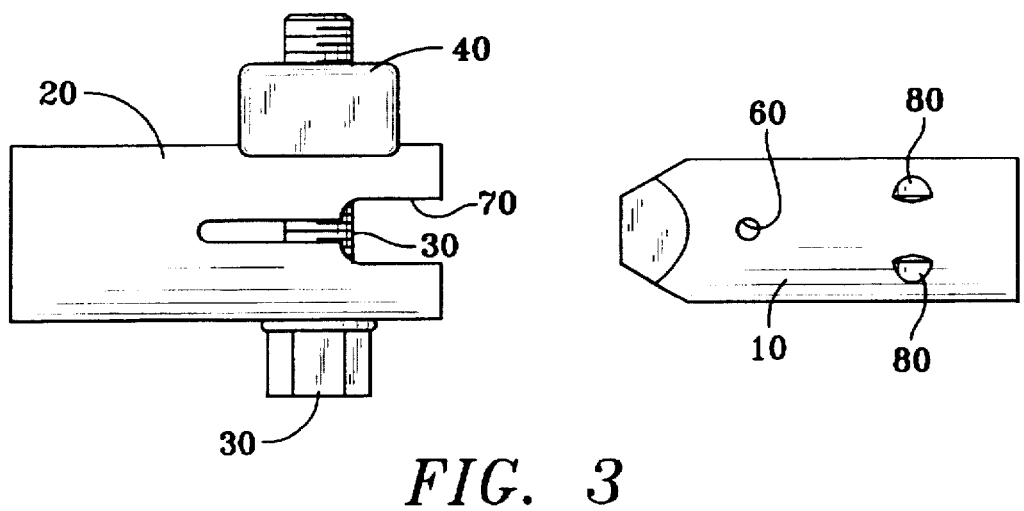
FIG. 3 is a top plan view of the system of FIG. 1.
Figure 4:
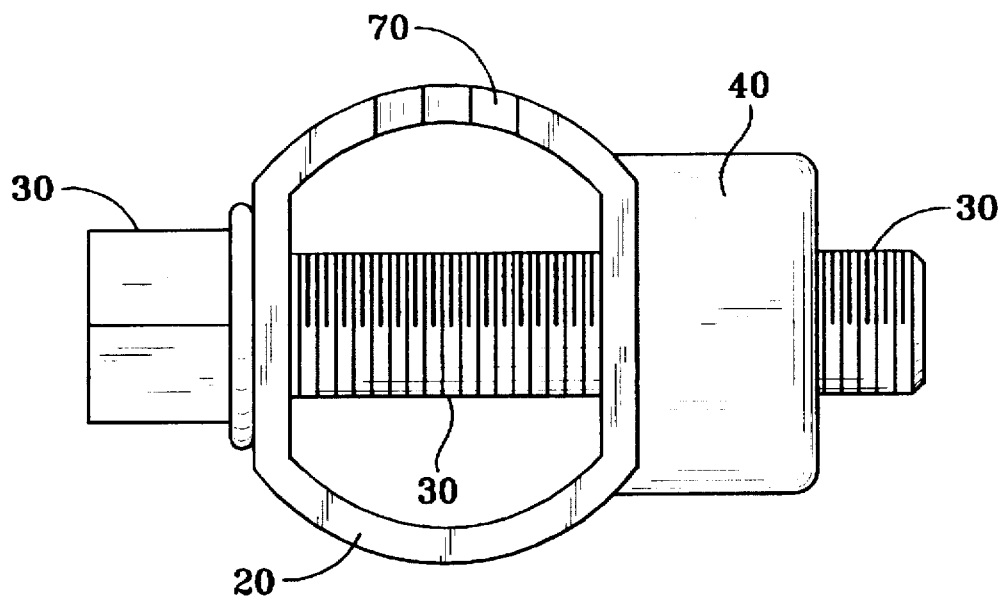
FIG. 4 is an end view of a tube member of the invention.
Figure 5:
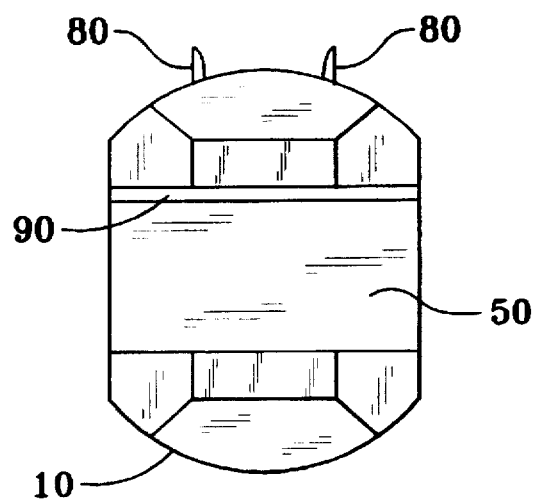
FIG. 5 is an end view of a shaft member of the invention.

The invention is best described by reference to all FIGS., since there are few parts, and some parts are visible in some views but not all views. A shaft member 10 and a hollow tube member 20 are each represented as only the end portions which are necessary for operation of the invention. It is understood that the distal portions of the shaft and tube may be of any size or configuration without affecting the invention.

The shaft member 10 has a transversely disposed slot 90, in which is fixed a spring retention clip 50 which snaps up after the shaft member is inserted in the hollow tube member 20. Upon such insertion, the clip 50 rides over the pin 30, which is sized to fit in the transversely disposed slot 90, and snaps back to retain the pin in the slot. Preferably the pin 30 is a bolt which is loosely threaded into a nut 40 fixed to the hollow tube member 20. After full insertion of the shaft member 10 into the hollow tube member 20, the fastener is torqued to a specified level to secure the assembly. The spring retention clip 50 is shown as a leaf spring disposed at an angle to the slot 90, but it could also be made as an appropriately oriented tapered latch member with a spring bias if space permits and strength requirements demand such.

A slot 70 in the tube member 20 assures proper orientation of the shaft member 10 with respect to the tube member by receiving a nib 80 which projects from the top surface of the shaft member and prevents insertion thereof in the wrong orientation. Nib 80 is sized to fit between the sides of the slot 70. A hole 60 penetrates the shaft member 10 opposite the spring retention clip 50 to provide access for a catch release tool, such as an alignment punch or a nail, to depress the clip and release the transverse pin 30 from the transverse slot 90. When fully assembled, the hole 60 can be reached through the slot 70 of the hollow tube member 20.

In the preferred embodiment, the tube member 20 is supplied with the fastener loosely threaded into the nut 40 which is welded or otherwise rendered integral to the tube member. For assembly, first the nib 80 of the shaft member 10 is aligned with the slot 70 of the tube member 20. Then, the shaft member 10 is inserted into the tube member 20 until the clip 50 rides over the fastener 30 and snaps back to capture the fastener 30 within the slot 90 of the shaft member. Finally, the fastener 30 is torqued to an appropriate value to secure the assembly. To disassemble, a nail or other catch releasing tool is inserted through the hole 60 to depress the spring retention clip 50 to permit the fastener 30 to ride over the clip and rest against the nail. The nail is then removed, and the fastener 30 is free to slide out of the slot 90 as the shaft member 10 is removed from the tube member 20.

This invention can be used for assembling any combination of members, as long as they can be equipped with engaging ends having the features of the shaft member 10 and the hollow tube member 20. It is especially suited for assembly of steering shafts in automobiles, where quality and assembly efficiency are of critical importance.

Having described the invention, I claim:

1. A quick connecting bayonet style linkage, comprising:

a hollow tube member having a transversely disposed pin near an engaging end;

a shaft member sized to have a sliding fit in the engaging end of said hollow tube member and having a transversely disposed slot sized to slide over said transversely disposed pin; and means for capturing said shaft member within the engaging end of said hollow tube member when said transversely disposed pin is engaged with said transversely disposed slot, said means for capturing comprising a spring biased catch within said transversely disposed slot, said spring biased catch having a taper which allows it to be displaced by said transversely disposed pin during insertion of said shaft member into said hollow tube member but not to be displaced during attempts to separate the members.

2. The quick connecting bayonet style linkage of claim 1, further comprising:

means for releasing said shaft member from capture within the engaging end of said hollow tube member; said means comprising a hole in said shaft member oriented to intersect said transversely disposed slot opposite to said spring biased catch, and a longitudinally disposed slot in said hollow tube member, said longitudinally disposed slot extending from said engaging end past said transversely disposed pin, such that said hole is accessible to a catch release tool when said shaft member is inserted in said hollow tube member.

3. The quick connecting bayonet style linkage of claim 1, wherein the transversely disposed pin comprises a threaded fastener.

4. The quick connecting bayonet style linkage of claim 1, further comprising:

means for providing correct orientation between said shaft member and said hollow tube member prior to insertion of said shaft member into said hollow tube member.

5. The quick connecting bayonet style linkage of claim 4, wherein the means for providing correct orientation between said shaft member and said hollow tube member comprises a projecting lug on said shaft member, said lug fitting into a longitudinally oriented slot in the engaging end of said hollow tube member.

\* \* \* \* \*